United States Patent [19]

Kawai et al.

[11] Patent Number: 5,063,531
[45] Date of Patent: Nov. 5, 1991

[54] OPTICAL NEURAL NET TRAINABLE IN RAPID TIME

[75] Inventors: Shigeru Kawai; Keiichi Kubota, both of Tokyo, Japan

[73] Assignee: NEC Corporation, Tokyo, Japan

[21] Appl. No.: 399,185

[22] Filed: Aug. 28, 1989

[30] Foreign Application Priority Data

| Aug. 26, 1988 | [JP] | Japan | 63-213125 |
| Aug. 26, 1988 | [JP] | Japan | 63-213126 |
| Aug. 26, 1988 | [JP] | Japan | 63-213128 |
| Aug. 26, 1988 | [JP] | Japan | 63-213130 |

[51] Int. Cl.$^5$ ............................................. G06G 7/16
[52] U.S. Cl. ...................................... 395/25; 364/822
[58] Field of Search ................................... 350/95–97, 350/161–163; 364/807, 822, 837, 841, 845, 513

[56] References Cited

U.S. PATENT DOCUMENTS

| 4,569,033 | 2/1986 | Collins et al. | 364/845 |
| 4,620,293 | 10/1986 | Schlunt et al. | 364/845 |
| 4,633,427 | 12/1986 | Bocker | 364/822 |
| 4,633,428 | 12/1986 | Byron | 364/841 |
| 4,800,519 | 1/1989 | Grinbers et al. | 364/822 |
| 4,804,250 | 2/1989 | Johnson | 364/822 |
| 4,843,587 | 6/1989 | Schlunt et al. | 364/841 |
| 4,862,405 | 8/1989 | Fisher | 364/822 |
| 4,888,724 | 12/1989 | Marom et al. | 364/807 |
| 4,908,751 | 3/1990 | Smith | 364/822 |

Primary Examiner—Jerry Smith
Assistant Examiner—Jim Trammell
Attorney, Agent, or Firm—Sughrue, Mion, Zinn Macpeak & Seas

[57] ABSTRACT

Among light emitting and sensitive element pairs arranged along rows and columns of a matrix in each of first and second layers of an optical computer operable as a neural network with one-to-one correspondence kept between the pairs in the first layer and the pairs in the second layer, the light emitting elements and the light sensitive elements are connected along the rows in the first layer and along the columns in the second layer. Optical intensity controlling elements of a panel are placed in optical paths defined by the pairs in the first layer and the pairs which correspond in the second layer to the pairs of the first layer, respectively. When the light emitting element rows are driven, optical beams are emitted by the light emitting elements of the first layer and controlled by the respective controlling elements to have first-layer controlled amounts of light, respectively. In response to the controlled amounts of light, the light sensitive element columns of the second layer produce second-layer output signals. It is possible to use the second-layer output signals in controlling the controlling elements and thereby to train the optical computer. If desired, the light emitting element columns of the second layer are driven by the second-layer output signals to make the light sensitive element rows of the first layer produce first-layer output signals and to use the first-layer output signals in controlling the controlling elements.

5 Claims, 3 Drawing Sheets

11 INPUT LAYER
12 OUTPUT LAYER

18 LIGHT EMITTING
19 LIGHT SENSITIVE

16 OR 17

OPTICAL NEURAL NET TRAINABLE IN RAPID TIME

BACKGROUND OF THE INVENTION

This invention relates to an optical computer operable as a neural network or net.

Optical computers are already known. For example, an optical computer is described in a letter contributed by Demetri Psaltis et al to the Optics Letters, Volume 10, No. 2 (February 1985), pages 98 to 100, under the title of "Optical Information Processing Based on an Associative-memory Model of Neural Nets with Thresholding and Feedback". According to Psaltis et al, a linear array of light emitting elements and a linear array of light sensitive elements are coupled together by anamorphic optics to implement the Hopfield model of interconnection. Another optical computer is described in an article contributed by Clark C. Guest et al to the Applied Optics, Volume 26, No. 23 (Dec. 1, 1987), pages 5055 to 5060, under the title of "Designs and Devices for Optical Bidirectional Associative Memories". According to Guest et al, a pair of spatial light modulators are orthogonally oriented with a connection matrix interposed. Both optical computers are operable as neural networks. However, the neural networks cannot be trained in rapid time according to Psaltis et al and Guest et al.

SUMMARY OF THE INVENTION

It is therefore an object of the present invention to provide an optical computer operable as a neural network which can be trained in real time.

Other objects of this invention will become clear as the description proceeds.

According to this invention, an optical computer comprises (A) a first and a second layer, each comprising pairs of light emitting and light sensitive elements in rows and columns, the light emitting elements being connected along the rows and the columns in the first and the second layers, respectively, the light sensitive elements being connected along the rows and the columns in the first and the second layers, respectively, the pairs in the first layer and the pairs in the second layer being in one-to-one correspondence to define a plurality of optical paths with each optical path defined between one of the pairs in the first layer and one of the pairs in the second layer that corresponds to the above-mentioned one of the pairs in the first layer; (B) first means connected to the rows of the light emitting elements of the first layer for making the light emitting elements of the first layer emit first primary amounts of light along the optical paths; (C) second means connected to the columns of the light emitting elements of the second layer for making the light emitting elements of the second layer emit second primary amounts of light along the optical paths; (D) a panel comprising optical intensity controlling elements in the optical paths, respectively, for controlling the first primary amounts of light into first controlled amounts of light and the second primary amounts of light into second controlled amounts of light; and (E) control means connected to the rows of the light sensitive elements of the first layer, the columns of the light sensitive elements of the second layer, and the controlling elements for controlling the controlling elements in proportion to the first controlled amounts of light received by the light sensitive elements of the second layer, respectively, and the second controlled amounts of light received by the light sensitive elements of the first layer, respectively.

DESCRIPTION OF THE PREFERRED EMBODIMENT

Figure 1:
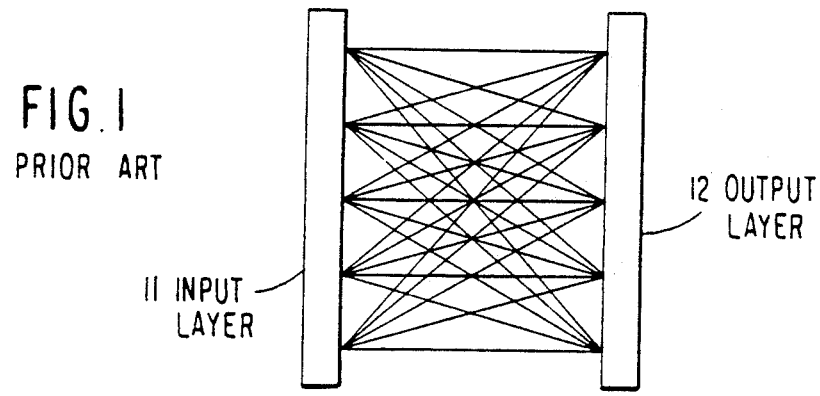
FIG. 1 is a schematic representation of a prior art two-layer neural network for use in describing the instant invention.

Referring to FIG. 1, a prior art neural network or net will be described at first in order to facilitate an understanding of the present invention. The neural network is a two-layer neural network comprising an input neuron layer 11 and an output neuron layer 12. Each layer 11 or 12 comprises a plurality of neural units or neurons which will presently be illustrated. The neural units of the input neuron layer 11 will be called input neural units. The neural units of the output neuron layer 12 will be called output neural units. In the example being illustrated, the neural network comprises five input neural units and five output neural units. The input neural units may be different in number from the output neural units.

In the manner known in the art, the input neural units are not connected to one another. The output neural units are neither connected to one another. Instead, the input neural units are connected to the output neural units by connections in various manners. In the illustrated example, each input neural unit is connected to all output neural units. As a result, each output neural unit is connected to all input neural units. Although depicted by single lines, the connections are weighting connections which have independently controllable weights.

More particularly, each input neural unit produces an input-unit output signal. The weighting connection forwardly transmits the input-unit output signal to each output neural unit as a weighted signal. Through the weighting connections, each output neural unit receives the weighted signals from the input neural units and produces a sum of the weighted signals as an output-unit output signal. It is desirable to train or adjust the controllable weights so that the output neural units may produce optimum output-unit output signals, respectively.

Figure 2:
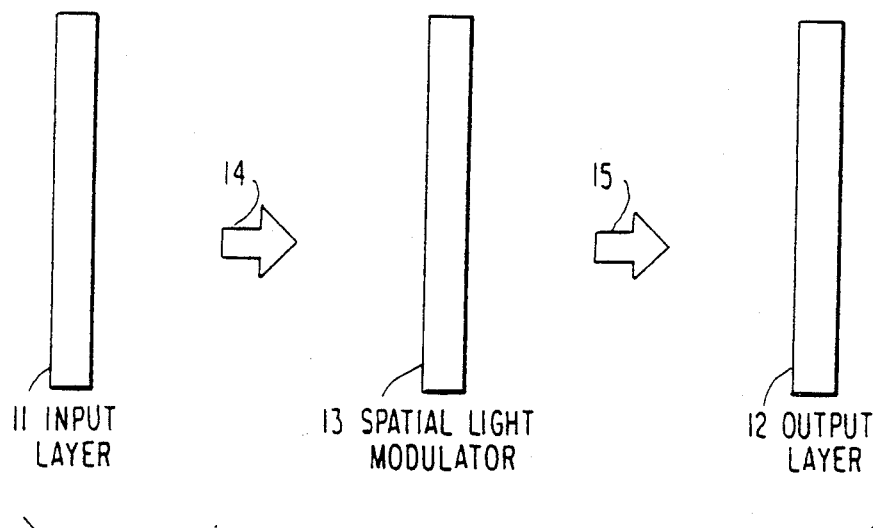
FIG. 2 is a schematic side view of a prior art optical computer for use in describing this invention.
Figure 3:
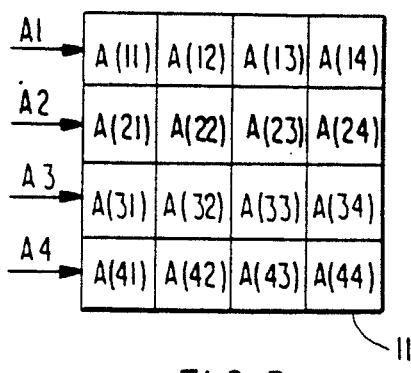
FIG. 3 is a top view of an input layer of the prior art optical computer illustrated in FIG. 2.
Figure 4:
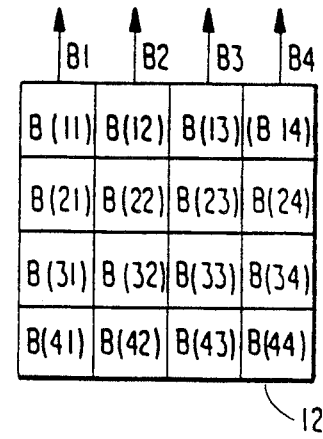
FIG. 4 is a top view of an output layer of the prior art optical computer depicted in FIG. 2.

Referring to FIGS. 2 through 4, a prior art optical computer will be described in preparation for the description of this invention. The optical computer is for implementing the neural network illustrated with reference to FIG. 1 and comprises input and output optical layers which correspond to the input and the output neuron layers and are therefore designated by the reference numerals 11 and 12.

In FIG. 3, the input optical layer 11 comprises a plurality of light emitting elements in rows and columns of a first matrix. In FIG. 4, the output optical layer 12 comprises a plurality of light sensitive elements in rows and columns of a second matrix. It will be assumed merely for simplicity of illustration that each matrix has first through fourth rows and first through fourth columns, making up a four by four matrix.

The input optical layer 11 therefore comprises first-row emitting elements A(11), A(12), A(13), and A(14), second-row emitting elements A(21), A(22), A(23), and A(24), third-row emitting elements A(31), A(32), A(33), and A(34), and fourth-row emitting elements A(41), A(42), A(43), and A(44). The output optical layer 12 comprises first-row sensitive elements B(11), B(12), B(13), and B(14), second-row sensitive elements B(21), B(22), B(23), and B(24), third-row sensitive elements B(31), B(32), B(33), and B(34), and fourth-row sensitive elements B(41), B(42), B(43), and B(44). In FIG. 3, the light emitting elements of each row are electrically connected together. In FIG. 4, the light sensitive elements of each column are electrically connected together. At any rate, the light emitting elements of the input optical layer 11 are in one-to-one correspondence to the light sensitive elements of the output optical layer 12.

In FIG. 2, the input and the output optical layers 11 and 12 are supported so that the light emitting elements A(i, j) and the light sensitive elements B(i, j) define a plurality of optical paths with each optical path defined by one of the light emitting elements and one of the light sensitive elements that corresponds to the light emitting element under consideration. In notations A(i, j) and B(i, j) of the light emitting and the light sensitive elements, i represents row numbers of the first and the second matrixes and j represents column numbers.

A spatial light modulator 13 is interposed between the input and the output optical layers 11 and 12. In the manner which will later be described, the spatial light modulator 13 comprises a plurality of controlling elements in the optical paths, respectively. The controlling elements have independently controllable optical transmissivities that is, the transmittance of each element can be controlled to a degree W(i, j).

In operation, first through fourth electric potential differences A1, A2, A3, and A4 are applied across the light emitting elements of the first through the fourth rows, respectively. The light emitting elements of each row produce a common amount of light depending on the potential difference supplied thereto. In this manner, the light emitting elements of the input optical layer 11 produce first through fourth output amounts of light Ai along the optical paths as indicated at 14.

In accordance with the controllable transmissivities, the controlling elements of the spatial light modulator 13 control the output amounts of light into controlled amounts of light. Inasmuch as the controlling elements of each row may have different transmissivities, the controlled amounts of light may be different along the respective optical paths. The spatial light modulator 13 produces the controlled amounts of light along the respective optical paths as indicated at 15.

In response to the controlled amounts of light, the light sensitive elements of the output optical layer 12 produce electric currents. Being connected together, the light sensitive elements of each column produce a sum of the electric currents produced by the light sensitive elements of the column, respectively. As a consequence, the light sensitive elements of the first through the fourth columns produce first through fourth current sums B1, B2, B3, and B4.

It is now understood that the output amounts of light of the optical computer correspond to the input-unit output signals of the neural network. The light emitting elements correspond to the input neural units. The controllable transmissivities correspond to the controllable weights. The light sensitive elements correspond to the output neural units. The current sums correspond to the output-unit output signals, which may be represented by Bj and are given according to:

$$Bj = \sum_i W(i,j) \cdot Ai.$$

By way of example, it will be presumed that the first through the third potential differences have a voltage ratio of 1:2:1 for a three by three matrix of light emitting elements and that the controllable transmissivities of the controlling elements of the first through the third rows have transmissivity ratios of 1:0:2, 2:1:1, and 1:2:1, respectively. The current sums are given by:

$$\begin{pmatrix} B1 \\ B2 \\ B3 \end{pmatrix} = \begin{pmatrix} 1 & 0 & 2 \\ 2 & 1 & 1 \\ 1 & 2 & 1 \end{pmatrix} \begin{pmatrix} 1 \\ 2 \\ 1 \end{pmatrix} = \begin{pmatrix} 3 \\ 1 \\ 6 \end{pmatrix},$$

which equation shows that the current sums have a current ratio of 3:1:6.

It is possible to make the optical computer to carry out learning, namely, to train the optical computer, as by a back-propagation training algorithm. When reference is had to an article contributed by William P. Jones et al to the Byte, October 1987, pages 155 to 162, under the title of "Back-Propagation; A Generalized Delta Learning Rule", the algorithm is what is called a delta learning rule and carried out according to:

$$W(i,j) = n[T(p,i) - O(p,i)]I(p,j),$$

where n represents a trial-independent learning rate, T(p, i) represents an optimum or desired result, O(p, i) represents an actual output of the optical computer, and I(p, j) represents the weights.

Figure 6:
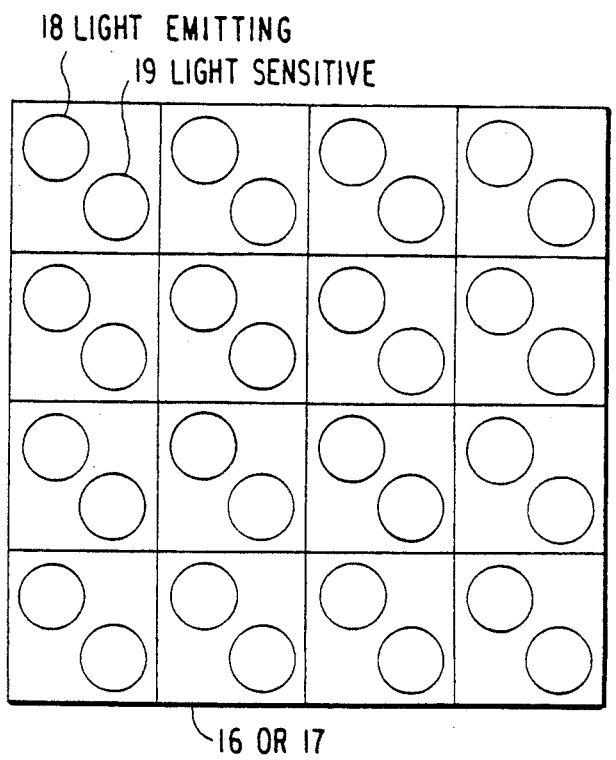
FIG. 6 is a top view of each of first and second layers of the optical computer device depicted in FIG. 5.
Figure 5:
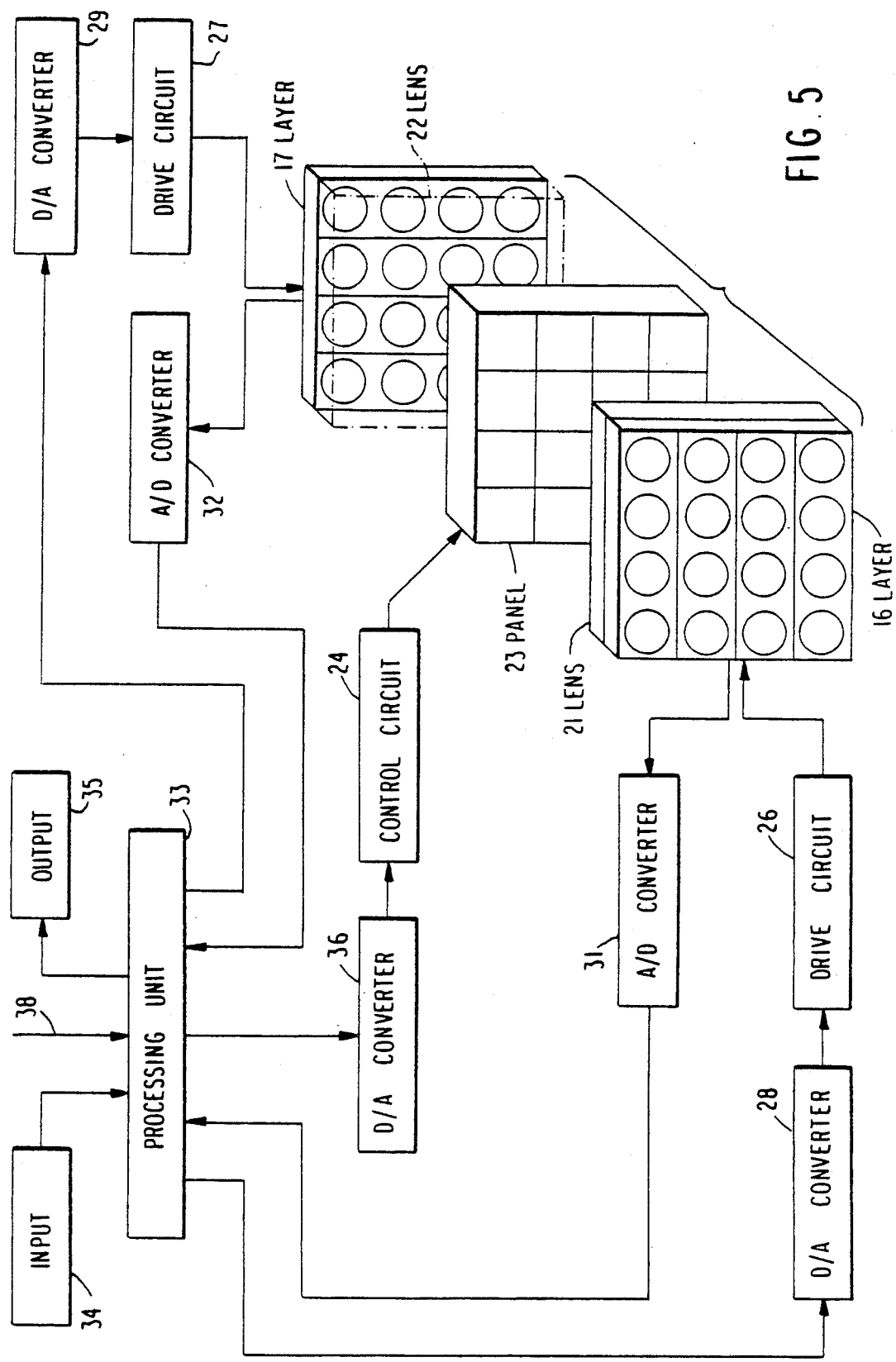
FIG. 5 is a block diagram of an optical computer according to an embodiment of this invention with an optical computer device shown by an exploded schematic perspective view.

Referring now to FIGS. 5 and 6, the description will proceed to an optical computer according to a preferred embodiment of this invention. In FIG. 5, the optical computer comprises an optical computer device comprising, in turn, a first layer 16 of neural units and a second layer 17 of neural units. In FIG. 6, each layer 16 or 17 comprises a plurality of neural units in rows and columns of a matrix. Each neural unit comprises a pair of light emitting and light sensitive elements. Preferably, each light emitting element is a laser diode. Each light sensitive element is a silicon photodetector.

In the manner schematically depicted in FIG. 6 as a four-row and four-column matrix, it is preferred that the light emitting and the light sensitive elements of each pair are adjacently arranged as indicated at 18 and 19 in each of the first matrix of the first layer 16 and the second matrix of the second layer 17. In the manner described in connection with FIGS. 3 and 4, the light emitting elements of the first layer 16 are connected together along the rows. The light sensitive elements of the second layer 17 are connected together along the columns. Moreover, the light sensitive elements of the first layer 16 are electrically connected together along the rows. The light emitting elements of the second layer 17 are electrically connected together along the columns.

In FIG. 5, each pair of the light emitting and the light sensitive elements is depicted by a single circle in the first and the second layers 16 and 17. Connections along the rows and the columns are symbolically shown by horizontal and vertical solid lines which are used to indicate the rows of the first matrix and the columns of the second matrix, respectively. The light emitting elements and the light sensitive elements are formed in each layer 16 or 17 together with the connections as an optoelectric integrated circuit.

Like the input and the output optical layers 11 and 12 mentioned in conjunction with FIG. 2, the first and the second layers 16 and 17 are supported by a jig (not shown) so that the pairs of the light emitting and the light sensitive elements in the first layer 16 and the pairs of the light emitting and the light sensitive elements in the second layer 17 are in one-to-one correspondence. A plurality of optical paths are defined by the one-to-one correspondence with each optical path defined between one of the pairs in the first layer 16 and one of the pairs that corresponds in the second layer 17 to the above-mentioned one of the pairs of the first layer 16. When each of the first and the second matrixes is a four by four matrix, the optical paths are sixteen in number.

In practice, first and second collimating lenses 21 and 22 are used to clearly define the optical paths by causing the electrons in the optical transmission to become more nearly parallel. Each collimating lens 21 or 22 is a micro-lens array known in the art of optical computers. It is to be noted in FIG. 5 that the second collimating lens 22 is depicted by dash-dot lines as if removed from the optical computer device. This is merely for clearly showing the second layer 17.

A panel 23 of optical intensity controlling elements is supported by the jig between the first and the second layers 16 and 17. Depicted by small rectangles, the controlling elements are arranged along rows and columns of a third matrix. The panel 23 corresponds to the spatial light modulator 13 described in connection with FIG. 2 and is preferably implemented by a liquid crystal display panel of twisted nematic liquid crystals together with electrical connections to the controlling elements like a liquid crystal television screen. In the example being illustrated, the controlling elements have optical transmissivities which are inpedendently controllable by a control circuit 24.

A first drive circuit 26 is connected to the rows of the light emitting elements of the first layer 16 to apply electric potential differences across the light emitting elements of the first layer 16. The light emitting elements of each row thereby produce a common amount of light depending on the potential difference supplied thereto. A second drive circuit 27 is connected to the columns of the light emitting elements of the second layer 17 to apply electric potential differences across the light emitting elements of the second layer 17. The light emitting elements of each column thereby produce a common amount of light depending on the potential difference supplied thereto.

Assisted by the first collimating lens 21, the light emitting elements of the first layer 16 emit first-layer primary amounts of light along the optical paths. Assisted by the second collimating lens 22, the light emitting elements of the second layer 17 emit second-layer primary amounts of light along the optical paths. The first-layer and the second-layer primary amounts of light may briefly be called first and second primary amounts of light. It should be noted that the first primary amounts of light are dependent on the rows of the light emitting elements of the first layer 16 and are independent of the columns of these light emitting elements. The second primary amounts of light are dependent on the columns of the light emitting elements of the second layer 17 and are independent of the rows of these light emitting elements.

It is now understood that the first drive circuit 26 serves, in cooperation with the first collimating lens 21, as a first arrangement connected to the rows of the light emitting elements of the first layer 16 for making the light emitting elements of the first layer 16 emit the first primary amounts of light along the optical paths. In cooperation with the second collimating lens 22, the second drive circuit 27 serves as a second arrangement connected to the columns of the light emitting elements of the second layer 17 for making the light emitting elements of the second layer 17 emit the second primary amounts of light along the optical paths. Inasmuch as the first and the second collimating lenses 21 and 22 are used in this manner, it is unnecessary to adjacently dispose the light emitting and the light sensitive elements in each pair of the first and the second layers 16 and 17. Incidentally, first and second digital-to-analog (D/A) converters 28 and 29 are used in driving the first and the second drive circuits 26 and 27.

In the manner described in connection with FIG. 2, the panel 23 produces first controlled amounts of light along the optical paths, respectively, under the control of the control circuit 24 and in response to the first primary amounts of light. Similarly, the panel 23 produces second controlled amounts of light along the respective optical paths.

In proportion to the second controlled amounts of light received through the first collimating lens 21, each row of the light sensitive elements of the first layer 16 produces a first current sum. Likewise, each column of the light sensitive elements of the second layer 17 produces a second current sum. In this manner, the rows of the light sensitive elements of the first layer 16 produce first-layer output analog signals, respectively. The columns of the light sensitive elements of the second layer 17 produce second-layer output analog signals, respectively. The first-layer and the second-layer output analog signals are alternatively called first and second output analog signals.

A first analog-to-digital (A/D) converter 31 is connected to the rows of the light sensitive elements of the first layer 16 to convert the first output analog signals to first-layer output digital signals. A second analog-to-digital converter 32 is connected to the columns of the light sensitive elements of the second layer 17 to convert the second analog output signals to second-layer output digital signals. The first-layer and the second-layer output digital signals are briefly called first and second output digital signals.

The first analog-to-digital converter 31 may alternatively be called a first detector. The second analog-to-digital converter 32 may likewise be called a second detector. The first detector 31 is connected to the rows of the light sensitive elements of the first layer 16 and produces the first output digital signals as first-layer or first output signals in proportion to the second controlled amounts of light. The second detector 32 is connected to the columns of the light sensitive elements of the second layer 17 and produces the second output digital signals as second-layer or second output signals in proportion to the first controlled amounts of light. Alternatively, the first output signals may collectively be called a first output signal. The second output signals may similarly be called a second output signal.

A processing unit 33 comprises a memory (not shown) and is connected to the first and the second analog-to-digital converters 31 and 32, an input unit 34, an output unit 35, the first and the second digital-to-analog converters 28 and 29 and thence to the first and the second drive circuits 26 and 27, and a control digital-to-analog (D/A) converter 36 and thence to the control circuit 24. Typically, the processing unit 33 is a personal computer available on the market.

Supplied from the input unit 34, a computer input signal is converted by the processing unit 33 to first drive digital signals. The first digital-to-analog converter 28 converts the first drive digital signals to first drive analog signals. The first drive circuit 26 uses the first drive analog signals as the afore-mentioned electric potential differences in making the respective rows of the light emitting elements of the first layer 16 emit the first primary amounts of light. In the meantime, the processing unit 33 produces first control digital signals. The control digital-to-analog converter 36 converts the first control digital signals to first control analog signals, which are used by the control circuit 24 in controlling the optical intensity controlling elements of the panel 23 for the first primary amounts of light.

Responsive to the second output signals, the processing unit 33 may deliver a computer output signal to the output unit 35. Alternatively, the second output signals are compared in the processing unit 33 with optimum output signals to adjust the first control digital signals into first adjusted control signals, respectively, and thereby to train or adjust the processing unit 33. The optimum output signals may either preliminarily be stored in the processing unit 33 or be supplied to the processing unit 33 through a connection 38.

As a further alternative, the processing unit 33 produces second drive digital signals in compliance with the second output signals. The second digital-to-analog converter 29 converts the second drive digital signals to second drive analog signals. The second drive circuit 27 uses the second drive analog signals as the above-mentioned electric potential differences in making the respective columns of the light emitting elements of the second layer 17 emit the second primary amounts of light in response to the second output signals. Meanwhile, the first adjusted control signals are stored in the memory of the processing unit 33. Furthermore, the processing circuit 33 produces second control digital signals. The control digital-to-analog converter 36 converts the second control digital signals to second control analog signals, which are used by the control circuit 24 to control the panel 23 for the second primary amounts of light.

It is now understood that the processing unit 33 can be programmed to put the optical computer into operation either as a multilayer or more-than-two-layer neural network for dealing with a single computer input signal at a time or as two independent neural networks for simultaneously dealing with two computer input signals. A combination of the processing unit 33, the first and the second analog-to-digital converters or the first and the second detectors 31 and 32, the control digital-to-analog converter 36, and the control circuit 24 serves as a control arrangement connected to the rows of the light sensitive elements of the first layer 16, the columns of the light sensitive elements of the second layer 17, and the optical intensity controlling elements of the panel 23 for controlling the optical transmissivities of the controlling elements in proportion to the second output signals, namely, the first controlled amounts of light received by the light sensitive elements of the second layer 17, respectively, and/or the first output signals, namely, the second controlled amounts of light received by the light sensitive elements of the first layer 16, respectively.

When the optical computer is used as the multilayer neural network, the control arrangement is connected to the first arrangement to make the light emitting elements of the first layer 16 emit the first primary amounts of light in proportion to the first output signals. The control arrangement is connected additionally to the second arrangement to make the light emitting elements of the second layer 17 emit the second primary amounts of light in proportion to the second output signals.

Under the circumstances, the control arrangement comprises the first analog-to-digital converter 31 connected to the rows of the light sensitive elements of the first layer 16 for producing the first output signals in proportion to the second controlled amounts of light received by the light sensitive elements of the first layer 16. The control arrangement is connected to the second analog-to-digital converter 32 and produces the second output signals in proportion to the first controlled amounts of light received by the light sensitive elements of the second layer 17. The control arrangement further comprises a panel control arrangement which is connected to the first and the second analog-to-digital converters 31 and 32 and the first and the second arrangements and comprises the control digital-to-analog converter 36 and the control circuit 24. The panel control arrangement is therefore connected to the optical intensity controlling elements of the panel 23 to make the rows of the light emitting elements of the first layer 16 emit the first primary amounts of light in proportion to the first output signals while controlling the controlling elements in proportion to the first output signals. The panel control arrangement furthermore makes the columns of the light emitting elements of the second layer 17 emit the second primary amounts of light in proportion to the second output signals while controlling the controlling elements in proportion to the second output signals.

Not only the second output signals but also the first output signals can be used in training or adjusting the processing unit 33 and thereby the optical computer. The processing unit 33 serves as a control signal supplying arrangement connected to the first and the second analog-to-digital converters 31 and 32 and the optical intensity controlling elements of the panel 23 to supply the controlling elements with first control signals in proportion to the first output signals and with second control signals in compliance with the second output signals. It is now possible to understand that the connection 38 depicts a training arrangement connected to the control signal supplying arrangement to train or adjust the control signal supplying arrangement so that the second control signals make the rows of the light sensitive elements of the first layer 16 collectively produce a first optimum output signal in proportion to the second output signals and that the first control signals make the columns of the light sensitive elements of the second layer 17 collectively produce a second optimum output signal in proportion to the first output signals.

In an application of the optical computer, a vector is represented by the computer input signal. It will be surmised that the vector has a plurality of vector components which are not greater in number than rows or columns of the light emitting and sensitive element pairs in each of the first and the second layers 16 and 17. A matrix is defined by the optical intensity controlling elements of the panel 23 to have matrix elements which are equal in number along each row or column to the number of vector components of the vector. It will readily be understood that the computer output signal represents a product of the vector and the matrix. When the vector components are used to drive the light emitting element rows of the first layer 16, respectively, the computer output signal should be derived from the second output signals.

It is usually sufficient that each of the first and the second layers 16 and 17 should comprise thirty light emitting and sensitive element pairs along each row or column. The panel 23 should comprise thirty optical intensity controlling elements along each row or column. Under the circumstances, each of the first and the second layers 16 and 17 and the panel 23 is about 5 cm by 5 cm wide and about 5 mm thick. The thickness of the first or the second layer 16 or 17 includes that of the first or the second collimating lens 21 or 22. The first layer 16 with the first collimating lens 21, the panel 23, and the second layer 17 with the second collimating lens 22 can be stacked into the optical computer device which is about 15 mm thick. It has been confirmed by the present inventors that the light emitting or sensitive elements may have about 50-percent different characteristics in the optical computer device and that the control signals for the panel 23 can be changed from one value to another in about 20 milliseconds.

While this invention has thus far been described in specific conjunction with a single preferred embodiment thereof, it will now be readily possible for one skilled in the art to put this invention into effect in various other manners. For example, the optical paths can be defined separately between each pair of the light emitting elements of the first layer 16 and the light sensitive elements of the second layer 17 and between each pair of the light emitting elements of the second layer 17 and the light sensitive elements of the first layer 16. In this embodiment, the light emitting elements of the first layer 16 and the light sensitive elements of the second layer 17 are in first one-to-one correspondence. The light emitting elements of the second layer 17 are in second one-to-one correspondence to the light sensitive elements of the first layer 16. The optical paths are defined by the first and the second one-to-one correspondence with each optical path defined between one of the light emitting elements of the first and the second layers 16 and 17 and one of the light sensitive elements of the second and the first layer 17 and 16 that corresponds to the light emitting element under consideration. The panel 23 should comprise twice as many optical intensity controlling elements. In another optical computer according to this invention, the optical intensity controlling elements of the panel 23 have controllable optical reflectivities. It is preferred in this event to support the first and the second layers 16 and 17 orthogonally and to support the panel 23 with an angle of 45° formed relative to the first and the second layers 16 and 17. Incidentally, it should clearly be understood that the numerical example is given above merely by way of example.

What is claimed is:

1. An optical computer comprising:
    a first and a second layer, each comprising pairs of light emitting and light sensitive elements in rows and columns, the light emitting elements being connected along the rows and the columns in said first and said second layers, respectively, the light sensitive elements being connected along the rows and the columns in said first and said second layers, respectively, the pairs in said first layer and the pairs in said second layer being in one-to-one correspondence to define a plurality of optical paths with each optical path defined between one of the pairs in said first layer and one of the pairs in said second layer that corresponds to said one of the pairs in said first layer;
    first means connected to the rows of the light emitting elements of said first layer for making the light emitting elements of said first layer emit first primary amounts of light along said optical paths;
    second means connected to the columns of the light emitting elements of said second layer for making the light emitting elements of said second layer emit second primary amounts of light along said optical paths;
    a panel comprising optical intensity controlling elements in said optical paths, respectively, for controlling said first primary amounts of light into first controlled amounts of light and said second primary amounts of light into second controlled amounts of light; and
    control means, connected to the rows of the light sensitive elements of said first layer, the columns of the light sensitive elements, of said second layer, and said controlling elements for controlling said controlling elements in proportion to the first controlled amounts of light received by the light sensitive elements of said second layer, respectively, and the second controlled amounts of light received by the light sensitive elements of said first layer, respectively.

2. An optical computer as claimed in claim 1, wherein said control means is connected to said first means to make the light emitting elements of said first layer emit the first primary amounts of light in proportion to the second controlled amounts of light received by the light sensitive elements of said first layer and is connected to said second means to make the light emitting elements of said second layer emit the second primary amounts of light in proportion to the first controlled amounts of light received by the light sensitive elements of said second layer.

3. An optical computer as claimed in claim 2, wherein said control means comprises:
    a first detector connected to the rows of the light sensitive elements of said first layer for producing first output signals in proportion to the second controlled amounts of light received by the light sensitive elements of said first layer;
    a second detector connected to the columns of the light sensitive elements of said second layer for producing second output signals in compliance with the first controlled amounts of light received by the light sensitive elements of said second layer; and panel control means connected to said first and said second detectors, to said first and said second means, and to said controlling elements for making the rows of the light emitting elements of said first layer emit the first primary amounts of light in proportion to said first output signals while controlling said controlling elements in proportion to said first output signals, said panel control means being furthermore for making the columns of the light emitting elements of said second layer emit the second primary amounts of light in proportion to said second output signals while said controlling elements in proportion to said second output signals.

4. An optical computer as claimed in claim 1, wherein said control means comprises:

control signal supplying means connected to the rows of the light sensitive elements of said first layer, the columns of the light sensitive elements of said second layer, and said controlling elements for supplying control signals to said controlling elements in proportion to the first controlled amounts of light received by the light sensitive elements of said second layer and the second controlled amounts of light received by the light sensitive elements of said first layer; and training means connected to said control signal supplying means for training said control signal supplying means so that said control signals make the rows of the light sensitive elements of said first layer produce a first optimum output signal in proportion to the second controlled amounts of light received by the light sensitive elements of said first layer, respectively, and the columns of the light sensitive elements of said second layer produce a second optimum output signal in proportion to the first controlled amounts of light received by the light sensitive elements of said second layer, respectively.

5. An optical computer as claimed in claim 1, further comprising:

input means connected to said first and said second means for supplying a computer input signal representative of a vector to one of said first and said second means to make said one of the first and the second means supply components of said vector to the rows of the light emitting elements of said first layer and to the columns of the light emitting elements of said second layer when said one of the first and the second means is said first and said second means, respectively; and output means connected to said control means for producing a computer output signal in response to the first controlled amounts of light received by the light sensitive elements of said second layer and in response to the second controlled amounts of light received by the light sensitive elements of said first layer when said one of the first and the second means is said first and said second means, respectively, said computer output signal representing a product of said vector and a matrix represented by the controlling elements of said panel.

* * * * *